May 27, 1941.  A. ROSCH  2,243,580

DASHPOT

Filed June 26, 1940

Inventor:
Arthur Rosch,
by Harry E. Dunham
His Attorney.

Patented May 27, 1941

2,243,580

UNITED STATES PATENT OFFICE 2,243,580

DASHPOT

Arthur Rosch, Brieselang, near Nauen, Osthavelland, Germany, assignor to General Electric Company, a corporation of New York Application June 26, 1940, Serial No. 342,595
In Germany July 24, 1939

2 Claims. (Cl. 188—97)

The present invention relates to dashpots comprising a cylinder with a piston movable therein and substantially filled with oil or like liquid. The upper and lower side of the piston communicate through a bypass usually including a valve. Such dashpots are used, for example, in isochronous governing mechanisms of the type disclosed in the Patent No. 2,077,384 to Dettenborn, issued April 20, 1937, and assigned to the same assignee as the present application. A dashpot broadly in such mechanisms constitutes a link adjustable in its length and forming part of a restoring mechanism. In many instances it has been found that the period of time it takes for a certain amount of oil to be displaced through the by-pass connecting the lower and upper sides of the piston is too long.

The object of my invention is to provide an improved construction and arrangement of dashpots whereby such period of time may be substantially reduced. This is accomplished in accordance with my invention by an arrangement which includes a by-pass offering a resistance to flow of fluid therethrough which is automatically controlled in response to movement of the dashpot piston.

For a better understanding of what I believe to be novel and my invention, attention is directed to the following description and the claims appended thereto in connection with the accompanying drawing.

Figure 1:
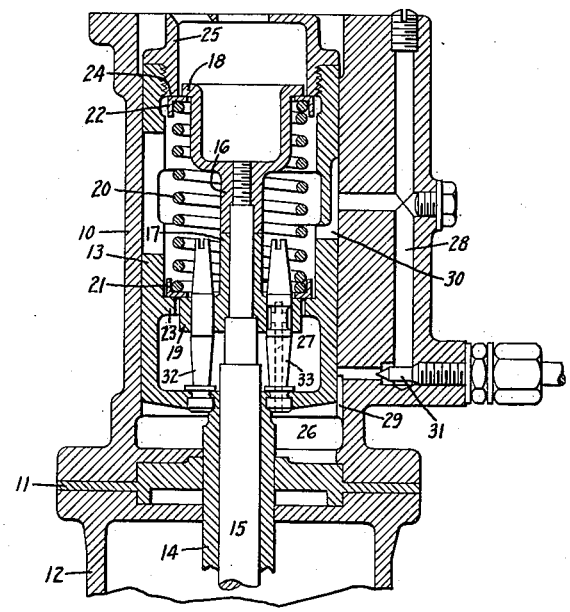
Figure 2:
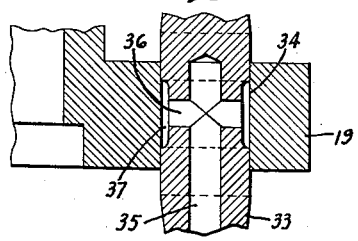
Figure 3:
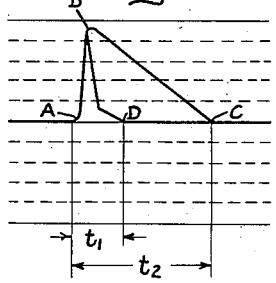

In the drawing, Fig. 1 illustrates a dashpot embodying my invention; Fig. 2 is an enlarged detail view of a part of Fig. 1; and Fig. 3 is an explanatory view.

The arrangement comprises a cylinder 10 with a lower end closed by a cover 11 and held on a support 12. A piston 13 is movably disposed within the cylinder and has a lower end secured to a hollow stem 14. The piston in the present instance is in the form of a cylindrical element with a bottom portion integrally formed with the hollow stem 14. A spindle 15 has a portion slidably disposed within the hollow stem 14 and an upper portion secured to two sleeves 16 and 17, each having an annular flange 18 and 19 respectively. A compression spring 20 is disposed within the upper hollow portion of the piston and has lower and upper ends engaging spring plates or washers 21 and 22 respectively. The washer 21 in the neutral position indicated engages a shoulder or annular projection 23 of the piston wall and also the flange 19. The upper washer 22 engages a shoulder 24 on the piston and the annular flange 18. The shoulder 24 is formed by a flanged cup 25 threaded into the upper end of the piston wall. The cylinder 10 and the piston 13 define two chambers, a chamber 26 below the bottom of the piston and a chamber 27 above the bottom of the piston and extending to the upper ends of the spring. The two chambers communicate in known manner through a by-pass 28 formed by bores in the side wall of the cylinder 10. The lower end of the by-pass communicates with the chamber 26 through a groove 29 in the inner surface of the cylinder 10 and with the chamber 27 through a port 30 formed in the piston side wall. The flow or displacement of fluid between the chambers 26 and 27 is adjustable by a needle valve 31 in the by-pass 28.

The operation of the dashpot described above is as follows: Sudden downward movement of the spindle 15 compresses the spring 20, forcing the upper washer 22 downward whereby the lower end of the spring and the washer 21 cause gradual downward movement of the piston due to the engagement of the washer 21 with the shoulder 23, thereby displacing oil or other liquid contained in the lower chamber 26 through the by-pass 28 into the upper chamber 27 until the spindle and the piston have returned to their original relative position in which the washers 21 and 22 engage the shoulders 23 and 24 respectively. The time delay between movement of the spindle 15 and the follow-up action of the piston 13 is a function of the restriction to flow of liquid through the by-pass and is a fixed value for a given position of the needle valve 31 and a given regulating action causing a certain impulse on the spindle. In many instances, as when such dashpots are used in connection with governing mechanisms controlling prime mover driven A. C. electric generators, it is important to reduce the delay of the dashpot action in order to reduce frequency variations of the generator. As stated above, the time delay of the dashpot is reduced in accordance with my invention by the provision of a by-pass which is automatically controlled by movement of the dashpot piston, more specifically by relative movement between the piston and the spindle.

In the present instance the arrangement includes two pins 32 and 33. Each pin has a lower portion secured and sealed to the bottom of the piston and an intermediate portion slidably projecting through an opening 34 in the annular flange 19. Both pins act as guides for the spindle and the elements secured thereto, preventing rotary relative movement between the spindle and the piston. The pin 33 in addition defines a passage or auxiliary by-pass which in certain positions effects direct communication between the chambers 26 and 27. More specifically the pin 33 has a vertical bore 35 communicating at its lower end with the chamber 26 and at its upper end through a cross bore 36 with an annular recess or port 37 (Fig. 2) in the outer surface of the pin. This annular recess in normal position as indicated is completely enclosed within the bore 34 of the flange 19. In fact the flange 19 in the present instance overlaps the recess 37 at both ends.

For slight, relative movement between the piston and the spindle due to slight regulating impulses exerted on them the auxiliary by-pass 35, 36 is ineffective. If the spindle 15 is moved relative to the piston a sufficient distance downward, the upper surface of the annular flange 19 is moved below the upper end of the recess or port 34 and thereby establishes direct connection between the chambers 26 and 27 through the auxiliary by-pass 35, 36, oil being permitted to flow from the chamber 26 through the auxiliary by-pass 35, 36 directly into the upper chamber 27; in addition, oil being by-passed in the usual manner from the chamber 26 through the main by-pass 28 into the upper chamber 27.

Similarly, if the spindle 15 is moved upward relative to the piston a sufficient distance until the lower face of the annular flange 19 uncovers the lower end of the recess 37, direct connection is established through the auxiliary by-pass and oil may flow from the upper chamber 27 through the bores 36, 35 into the lower chamber 26. With this arrangement the time delay during sudden considerable relative movements of the spindle 15 is substantially reduced. This can best be seen from consideration of Fig. 3 in which the curve ABC illustrates the movement of the piston of a dashpot, as shown in Fig. 1, but without the auxiliary by-pass and curve ABD illustrates the movement of a similar arrangement with an auxiliary by-pass as described above. The period of time $t_1$ in the latter instance is only about one-third of the period of time $t_2$ of the normal arrangement without the auxiliary by-pass.

What I claim as new and desire to secure by Letters Patent of the United States, is:

1. Dashpot arrangement comprising a cylinder, a piston movable in the cylinder and forming two chambers therewith, a spindle, means including a spring connecting the spindle to the piston and normally maintaining a fixed relative position between them, and means including a pin secured to the piston and a member secured to the spindle defining a by-pass having a restriction to flow of fluid varying in response to relative movement between the piston and the spindle.

2. Dashpot arrangement comprising a cylinder, a piston movable in the cylinder and defining lower and upper chambers therewith, an adjustable by-pass connecting the chambers, a spindle projecting into the piston, a spring normally holding the spindle and the piston in fixed relative position, a flange with a bore secured to the spindle, a pin secured to the piston and having a central bore communicating with the lower chamber, and a cross bore communicating with the central bore and normally closed by the bore in the flange, said cross bore in a certain relative position between the spindle and the piston establishing direct communication between the lower and upper chanmbers.

ARTHUR ROSCH.